United States Patent
Peterson et al.

(10) Patent No.: US 11,690,323 B2
(45) Date of Patent: Jul. 4, 2023

(54) AGRICULTURAL BALER WITH PIVOTABLE ROLL HAVING EXTERNAL PORTION

(71) Applicant: CNH Industrial America LLC, New Holland, PA (US)

(72) Inventors: C. Brandon Peterson, West Grove, PA (US); Ryan M. Figgins, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 592 days.

(21) Appl. No.: 16/803,384

(22) Filed: Feb. 27, 2020

(65) Prior Publication Data

US 2021/0267130 A1 Sep. 2, 2021

(51) Int. Cl.
*A01F 15/08* (2006.01)
*A01F 15/07* (2006.01)
*A01F 15/18* (2006.01)

(52) U.S. Cl.
CPC .............. *A01F 15/18* (2013.01); *A01F 15/07* (2013.01); *A01F 2015/079* (2013.01); *A01F 2015/186* (2013.01)

(58) Field of Classification Search
CPC .... A01F 15/18; A01F 15/07; A01F 2015/186; A01F 2015/079; A01F 15/077; A01F 15/078
See application file for complete search history.

(56) References Cited

U.S. PATENT DOCUMENTS

| | | | | |
|---|---|---|---|---|
| 4,172,354 | A | * 10/1979 | Vermeer | A01F 15/07 100/88 |
| 4,956,968 | A | * 9/1990 | Underhill | A01F 15/0715 53/118 |
| 5,193,450 | A | 3/1993 | Anderson | |
| 5,931,089 | A | * 8/1999 | Viesselmann | A01F 15/07 100/88 |
| 6,655,121 | B1 | * 12/2003 | Viesselmann | A01F 15/106 100/88 |
| 7,275,360 | B2 | 10/2007 | Viaud | |
| 2015/0327442 | A1 | * 11/2015 | Gaudreault | A01F 15/0715 100/3 |
| 2020/0229351 | A1 | * 7/2020 | Smith | A01F 15/106 |

* cited by examiner

*Primary Examiner* — Edward T Tolan
*Assistant Examiner* — Mohammed S. Alawadi
(74) *Attorney, Agent, or Firm* — Peter Zacharias

(57) ABSTRACT

A baling chamber for an agricultural baler includes: a plurality of sidewalls defining a volume, one of the sidewalls having a roll opening formed therein; a plurality of belts disposed within the volume; a sledge assembly including at least one roll that is pivotable within the volume, the at least one roll having an exterior portion that extends out of the volume through the roll opening and a bearing disposed outside of the volume and associated with the exterior portion; and a drive assembly disposed outside of the volume, coupled to the exterior portion, and configured to rotate the at least one roll.

16 Claims, 3 Drawing Sheets

AGRICULTURAL BALER WITH PIVOTABLE ROLL HAVING EXTERNAL PORTION

BACKGROUND OF THE INVENTION

The present invention pertains to agricultural balers and, more specifically, to agricultural balers that include one or more pivotable rolls.

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

A round baler may generally include a chassis, supported by wheels, a pickup unit to engage and lift the crop material into the baler, a cutting unit, a main baling chamber for forming a bale, and a wrapping mechanism for wrapping or tying a material around the bale after it has been formed in the main baling chamber. As the baler is towed over a windrow, the pickup unit lifts the crop material into the baler. Then, the crop material may be cut into smaller pieces by the cutting unit. As the crop material enters the main baling chamber, multiple carrier elements, e.g. rollers, chains and slats, and/or belts, will begin to roll a bale of hay within the chamber. These carrier elements are movable so that the chamber can initially contract and subsequently expand to maintain an appropriate amount of pressure on the periphery of the bale. After the bale is formed and wrapped by the wrapping mechanism, the rear of the baler is configured to open for allowing the bale to be discharged onto the field.

What is needed in the art is a way to reduce the risk of debris interfering with baling in an agricultural baler.

SUMMARY OF THE INVENTION

Exemplary embodiments provided according to the present disclosure include a baling chamber having a sledge assembly with a pivotable roll that has an external portion extending outside of a volume of the baling chamber and a drive assembly that is coupled to the external portion outside of the volume.

In some exemplary embodiments provided in accordance with the present disclosure, a baling chamber for an agricultural baler includes: a plurality of sidewalls defining a volume, one of the sidewalls having a roll opening formed therein; a plurality of belts disposed within the volume; a sledge assembly including at least one roll that is pivotable within the volume, the at least one roll having an exterior portion that extends out of the volume through the roll opening and a bearing disposed outside of the volume and associated with the exterior portion; and a drive assembly disposed outside of the volume, coupled to the exterior portion, and configured to rotate the at least one roll.

In some exemplary embodiments provided in accordance with the present disclosure, an agricultural baler includes: a chassis and a baling chamber carried by the chassis. The baling chamber includes: a plurality of sidewalls defining a volume, one of the sidewalls having a roll opening formed therein; a plurality of belts disposed within the volume; a sledge assembly including at least one roll that is pivotable within the volume, the at least one roll having an exterior portion that extends out of the volume through the roll opening and a bearing disposed outside of the volume and associated with the exterior portion; and a drive assembly disposed outside of the volume, coupled to the exterior portion, and configured to rotate the at least one roll.

One possible advantage that may be realized by exemplary embodiments provided according to the present disclosure is that placing the external portion, the bearing, and the drive assembly outside of the volume of the baling chamber reduces the risk of crop debris interfering with baling.

Another possible advantage that may be realized by exemplary embodiments provided according to the present disclosure is that the location of the drive assembly, the bearing, and the external portion outside of the volume of the baling chamber makes it easier and more convenient to perform maintenance and repairs.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural baler and/or components thereof are usually determined with reference to the direction of forward operative travel of the towing vehicle, but they should not be construed as limiting. The terms "longitudinal" and "transverse" are determined with reference to the fore-and-aft direction of the towing vehicle and are equally not to be construed as limiting.

Figure 1:
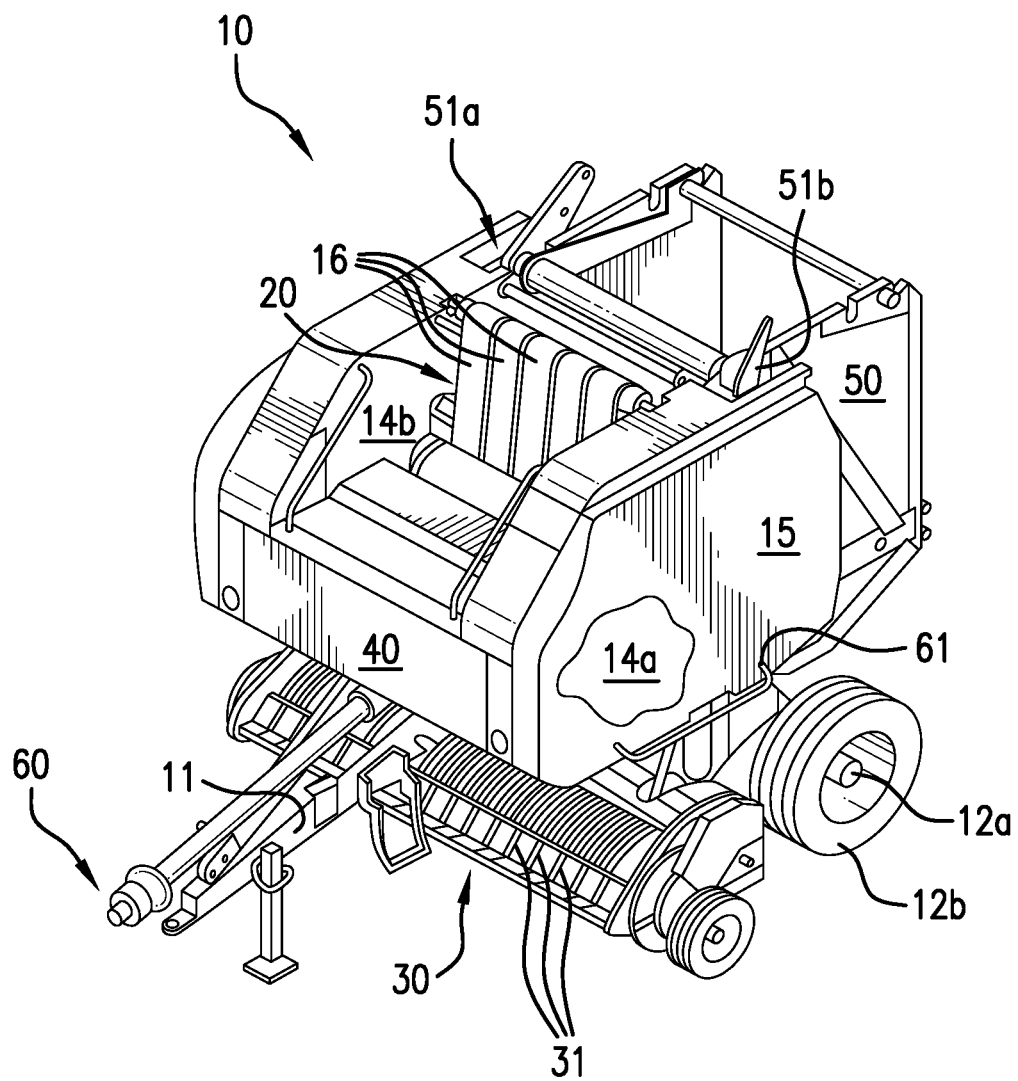
FIG. 1 illustrates a perspective view of an exemplary embodiment of an agricultural baler including a baling chamber, provided in accordance with the present disclosure.

Referring now to the drawings, and more particularly to FIG. 1, an exemplary embodiment of a round baler 10 is shown to include a chassis terminating forwardly in a tongue 11 and rearward slightly beyond a transverse axle 12a to which a pair of wheels 12b (only one shown) is mounted, thus forming a wheel supported chassis. The chassis supports a series of belts 16 and floor rolls. A first sidewall 14a (shown in the breakout) behind and generally parallel to cover panel 15 and a second sidewall 14b are connected to collectively define a volume of a baling chamber 20, with the belts 16 and floor rolls disposed in the volume. Cut crop material is picked up by a plurality of tines 31 carried by a transverse pickup roll 30 and fed through a harvesting assembly into the baling chamber 20 where it is formed into a cylindrically shaped bale by a series of conveyor belts 16. The bale is then optionally wrapped with twine or a net wrapping material dispensed from a wrapping mechanism generally behind shield 40. Upon completion of the optional wrapping process, the tailgate 50 pivots upwardly about pivot points 51a, 51b and the bale is discharged onto the ground. The chassis may also carry a power take-off (PTO) 60, which is configured to couple to a power source, e.g., a coupling of a tractor that draws power from an engine of the tractor, and provide mechanical power to components of the baler 10.

Figure 2:
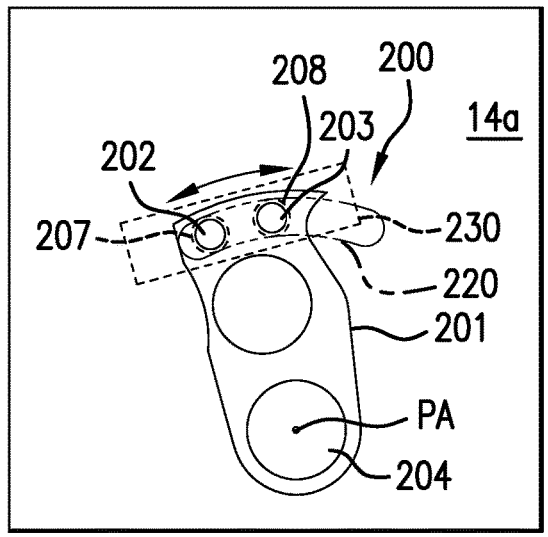
FIG. 2 illustrates a side view of an exemplary embodiment of a baling chamber having a sledge assembly with pivotable rolls in a first position, provided in accordance with the present disclosure.
Figure 3:
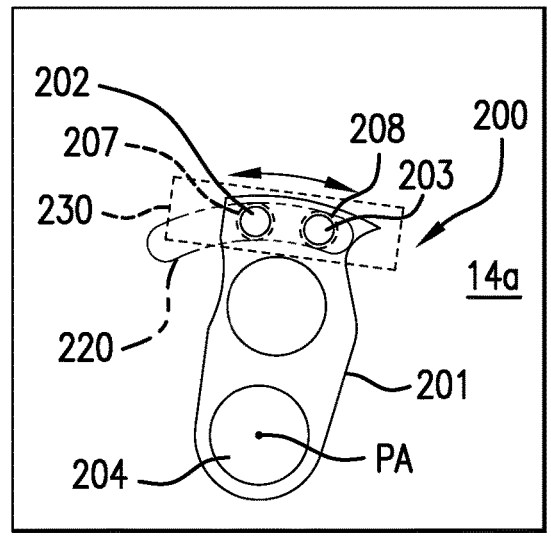
FIG. 3 illustrates a side view of the baling chamber of FIG. 2 after the rolls have pivoted to a second position.

Referring specifically now to FIGS. 2 and 3, it is illustrated that the baler 10 includes a sledge assembly 200 that is disposed within the volume of the baling chamber 20. The sledge assembly 200 includes a sledge 201 that is coupled to and pivotably carries pivotable rolls 202, 203. The sledge 201 may be pivoted, for example, about a pivot region 204 that defines a pivot axis PA. During baling, the sledge 201 may be forced to pivot from a first position (illustrated in FIG. 2) to a second position (illustrated in FIG. 3) by a forming bale, which becomes increasingly larger. As the sledge 201 pivots, the coupled rolls 202, 203 also pivot.

During baling, crop material is conveyed into the baling chamber where belts urge the material upwardly into engagement with the rolls of the sledge assembly, which rotate to coil crop material in a round direction to form and add to a bale core. The rolls are typically driven by connecting to one or more drives, which draw mechanical power from connection to the PTO. In known balers where the rolls and drive(s) are located within the volume of the baling chamber, the mechanical drive components of the rolls are prone to coming into contact with crop material debris and dust during baling. The crop material debris and dust can interfere with operation of the rolls by, for example, increasing the friction in the mechanical connection between the rolls and their drive(s).

Figure 4:
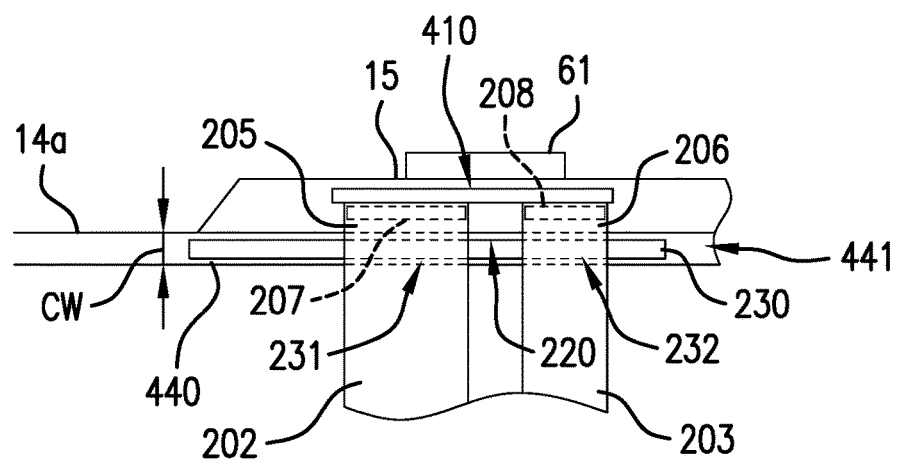
FIG. 4 illustrates a top sectional view of the baling chamber illustrated in FIGS. 1-3.

To address some of the previously described issues with known balers, and referring now to FIG. 4 as well, one or more of the pivotable rolls 202, 203 of the sledge assembly 200 includes an exterior portion 205, 206 that extends out of the volume of the baling chamber 20 through a roll opening 220 formed in one of the sidewalls, such as the sidewall 14a. As illustrated, each of the rolls 202, 203 has a respective exterior portion 205, 206 that extends out of the volume of the baling chamber 20. The exterior portions 205, 206 may be, for example, stub shafts. The roll opening 220 may be an arcuate slot that is shaped to correspond to the pivoting movement of the exterior portions 205, 206 of the pivotable rolls 202, 203 as the rolls 202, 203 pivot during baling. A bearing 207, 208 is associated with each respective exterior portion 205, 206 by, e.g., coupling the bearings 207, 208 to each respective exterior portion 205, 206. The bearings 207, 208 may be journaled within the roll opening 220 to stabilize the exterior portions 205, 206.

A drive assembly 410 is disposed outside of the volume of the baling chamber 20 and coupled to the exterior portions 205, 206. The drive assembly 410 is configured to rotate the exterior portions 205, 206. The drive assembly 410 may include, for example, one or more sprockets and chains that are coupled to the power take-off 60 to transfer mechanical power, i.e., rotary power, to the rolls 202, 203 and cause rotation of the rolls 202, 203. By placing the drive assembly 410, the exterior portions 205, 206, and the bearings 207, 208, outside of the volume of the baling chamber 20, the risk of crop material debris interfering with operation of the rolls 202, 203 is reduced because most of the crop material debris stays within the volume of the baling chamber 20. It should be appreciated that while the drive assembly 410 is described as including chains and sprockets, this is just one exemplary way of providing a drive assembly that is configured to rotate the rolls 202, 203, and other drive assemblies, such as independently powered rotary motors, may also be utilized according to the present disclosure.

To further protect the drive assembly 410, the exterior portions 205, 206, and the bearings 207, 208 from crop material debris and dust, a movable cover 230 (first illustrated in FIG. 2) may be provided that is carried with the rolls 202, 203 and at least partially covers the roll opening 220. The movable cover 230 may include respective openings 231, 232, with each of the rolls 202, 203 extending through a respective one of the openings 231, 232. The movable cover 230 may, for example, cover at least 90% of the roll opening 220 that is not occupied by the rolls 202, 203; in some embodiments, the movable cover 230 covers substantially all of the roll opening 220 that is not occupied by the rolls 202, 203. The movable cover 230 may be a sheet comprising a variety of materials, including but not limited to polymers, such as polyethylene, and/or metals, such as aluminum. Covering most, if not substantially all, of the roll opening 220 with the movable cover 230 reduces the risk of crop material debris exiting the volume of the baling chamber 20 through the roll opening 220 and accumulating on the drive assembly 410, the exterior portions 205, 206, and/or the bearings 207, 208.

The baling chamber 20 may include a channel wall 440 (illustrated in FIG. 4) that is spaced from the sidewall 14a that has the roll opening 220 formed therein. The channel wall 440 and the sidewall 14a may define a channel 441 therebetween. The movable cover 230 may be at least partially disposed, if not fully disposed, in the channel 441. The channel 441 can act to guide movement of the movable cover 230 during pivoting of the rolls 202, 203 to reduce the risk of the movable cover 230 jamming and interfering with pivoting of the rolls 202, 203. In this respect, the movable cover 230 may be configured to slide within the channel 441 during pivoting of the rolls 202, 203. The channel 441 may define a channel width CW that is approximately equal to a thickness of the movable cover 230 so there is little clearance between the walls 14a, 440 defining the channel 441 and the movable cover 230. Having little clearance between the walls 14a, 440 and the movable cover 230 helps to stabilize the movable cover 230 during movement and is conducive to smooth movement of the cover 230 within the channel 441. It should be appreciated, however, that the movable cover 230 may be movable in a variety of other ways, e.g., by using rollers, and the foregoing way of providing the movable cover 230 is exemplary only.

In some embodiments, the previously described cover panel 15 is movably coupled with the sidewall 14a having the roll opening 220 formed therein. The cover panel 15 can cover the exterior portions 205, 206, the bearings 207, 208, and the drive assembly 410 from the exterior so dust and debris from outside the baling chamber 20 are less likely to end up accumulating on the exterior portions 205, 206, the bearings 207, 208, and/or the drive assembly 410. The cover panel 15 may be hinged to the sidewall 14a so an operator can easily move the cover panel 15 away from the sidewall 14a by pulling on a handle 61 that is coupled to the cover panel 15. When the cover panel 15 is moved, the exterior portions 205, 206, the bearings 207, 208, and the drive assembly 410 are exposed, which allows an operator to perform maintenance and/or repairs on the exterior portions 205, 206, the bearings 207, 208, and/or the drive assembly 410. Thus, placing the exterior portions 205, 206, the bearings 207, 208, and the drive assembly 410 outside of the volume of the baling chamber 20 but within a space covered by the cover panel 15 both protects the exterior portions 205, 206, the bearings 207, 208, and the drive assembly 410 from debris and dust that are produced during baling and provides easy access to the exterior portions 205, 206, the bearings 207, 208, and the drive assembly 410 for maintenance and/or repairs.

Figure 5:
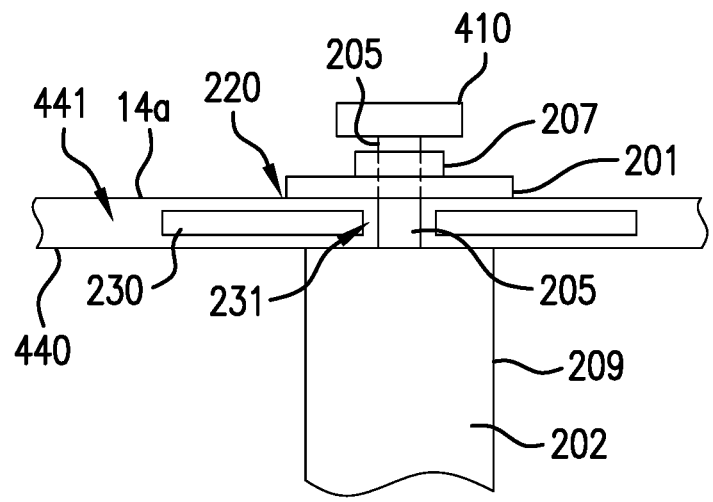
FIG. 5 illustrates a top sectional view of another arrangement of the baling chamber illustrated in FIGS. 1-3.

Referring now to FIG. 5, another exemplary arrangement of the baling chamber 20 is illustrated with one of the rolls 202 having an exterior portion 205 in the form of a stub shaft 205 that extends from an end of an interior portion 209 of the roll 202. The entirety of the interior portion 209 of the roll 202 may be disposed on an interior of the channel wall 440, i.e., the interior portion 209 of the roll 202 does not extend into the channel 441. As illustrated, the stub shaft 205 may define a diameter that is less than a diameter of the interior portion 209 of the roll 202. The stub shaft 205 extends through the roll opening 220 as well as the opening 231 formed in the movable cover 230. The pivotable sledge 201 configured to carry the roll 202 may also be disposed outside of the volume of the baling chamber 20 defined within the side walls 14a, 14b. The bearing 207 may be disposed on the stub shaft 205 between the sledge 201 and the drive assembly 410, as illustrated. In other respects, the arrangement of components of the baling chamber 20 illustrated in FIG. 5 may be similar to the baling chamber 20 illustrated in FIGS. 1-4.

Figure 6:
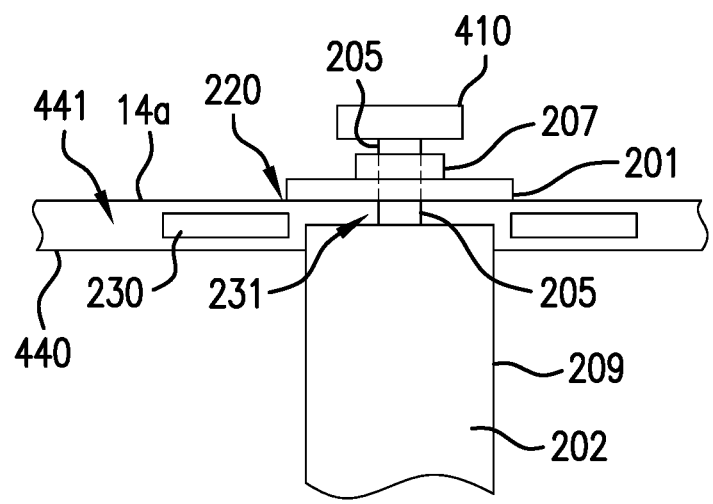
FIG. 6 illustrates a top sectional view of yet another arrangement of the baling chamber illustrated in FIGS. 1-3.

Referring now to FIG. 6, yet another exemplary arrangement of the baling chamber 20 is illustrated. Unlike the arrangement in FIG. 5, the roll 202 in the arrangement illustrated in FIG. 6 has an interior portion 209 that partially extends into the channel 441. In other respects, the arrangement illustrated in FIG. 6 is similar to the arrangement illustrated in FIG. 5, so further description is omitted for brevity. It should thus be appreciated that the arrangement of the components of the baling chamber 20 described herein may be altered in a variety of ways according to the present disclosure.

From the foregoing, it should be appreciated that the baling chamber 20 provided according to the present disclosure may be less prone to crop material debris and dust interfering with operation than balers with drive assemblies that couple to rolls of the sledge assembly within the volume of the baling chamber. Placing the exterior portions 205, 206 and the bearings 207, 208 of the rolls 202, 203, as well as the drive assembly 410, outside of the volume of the baling chamber 20 reduces the accessibility of these components to dust and debris that are produced during baling. Further, placing these components outside of the volume of the baling chamber 20 can make it easier to maintain and/or repair these components because an operator does not need to get within the volume of the baling chamber 20 to access the components. Thus, the baling chamber 20 provided according to the present disclosure may be less prone to the effects of dust and debris and also be easier to maintain and repair.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A baling chamber for an agricultural baler, comprising:
   a plurality of sidewalls defining a volume, one of the sidewalls having a roll opening formed therein;
   a plurality of belts disposed within the volume;
   a sledge assembly comprising at least one roll that is pivotable within the volume and a pivotable sledge coupled to the at least one roll, the at least one roll comprising an exterior portion that extends out of the volume through the roll opening and a bearing disposed outside of the volume and associated with the exterior portion;
   a movable cover carried with the at least one roll and at least partially covering the roll opening; and
   a drive assembly disposed outside of the volume, coupled to the exterior portion, and configured to rotate the at least one roll.

2. The baling chamber of claim 1, wherein the movable cover is configured to cover at least 90% of the roll opening that is not occupied by the at least one roll.

3. The baling chamber of claim 1, further comprising a channel wall spaced from the sidewall having the roll opening formed therein to define a channel between the channel wall and the sidewall, the movable cover being at least partially disposed in the channel.

4. The baling chamber of claim 3, wherein the movable cover is configured to slide within the channel during pivoting of the at least one roll.

5. The baling chamber of claim 1, wherein the roll opening is an arcuate slot.

6. The baling chamber of claim 1, wherein the at least one roll comprises a plurality of rolls, each of the rolls having a respective exterior portion that extends out of the volume through the roll opening.

7. The baling chamber of claim 1, further comprising a cover panel movably coupled with the sidewall having the roll opening formed therein, the cover panel covering the exterior portion of the at least one roll and the drive assembly.

8. The baling chamber of claim 1, wherein the sledge is disposed outside of the volume.

9. An agricultural baler, comprising:
   a chassis; and
   a baling chamber carried by the chassis, the baling chamber comprising:
      a plurality of sidewalls defining a volume, one of the sidewalls having a roll opening formed therein;
      a plurality of belts disposed within the volume;
      a sledge assembly comprising at least one roll that is pivotable within the volume and a pivotable sledge coupled to the at least one roll, the at least one roll comprising an exterior portion that extends out of the volume through the roll opening and a bearing disposed outside of the volume and associated with the exterior portion;
      a movable cover carried with the at least one roll and at least partially covering the roll opening; and
      a drive assembly disposed outside of the volume, coupled to the exterior portion, and configured to rotate the at least one roll.

10. The agricultural baler of claim 9, wherein the movable cover is configured to cover at least 90% of the roll opening that is not occupied by the at least one roll.

11. The agricultural baler of claim 9, further comprising a channel wall spaced from the sidewall having the roll opening formed therein to define a channel between the channel wall and the sidewall, the movable cover being at least partially disposed in the channel.

12. The agricultural baler of claim 11, wherein the movable cover is configured to slide within the channel during pivoting of the at least one roll.

13. The agricultural baler of claim 9, wherein the roll opening is an arcuate slot.

14. The agricultural baler of claim 9, wherein the at least one roll comprises a plurality of rolls, each of the rolls having a respective exterior portion that extends out of the volume through the roll opening.

15. The agricultural baler of claim 9, further comprising a cover panel movably coupled with the sidewall having the roll opening formed therein, the cover panel covering the exterior portion of the at least one roll and the drive assembly.

16. The agricultural baler of claim 9, further comprising a power take-off carried by the chassis and coupled to the drive assembly, the power take-off being configured to couple to a power source and provide mechanical power to the drive assembly.

* * * * *